(12) United States Patent
Saito

(10) Patent No.: US 10,505,589 B2
(45) Date of Patent: Dec. 10, 2019

(54) SIGNAL BRIDGE DEVICE

(71) Applicant: PEZY Computing K.K., Tokyo (JP)

(72) Inventor: Motoaki Saito, Tokyo (JP)

(73) Assignee: PEZY COMPUTING K.K., Tokyo (JP)

( * ) Notice: Subject to any disclaimer, the term of this patent is extended or adjusted under 35 U.S.C. 154(b) by 154 days.

(21) Appl. No.: 15/550,277

(22) PCT Filed: Feb. 19, 2015

(86) PCT No.: PCT/JP2015/054678
§ 371 (c)(1),
(2) Date: Aug. 10, 2017

(87) PCT Pub. No.: WO2016/132519
PCT Pub. Date: Aug. 25, 2016

(65) Prior Publication Data
US 2018/0278296 A1 Sep. 27, 2018

(51) Int. Cl.
*H04B 5/00* (2006.01)
*H04B 5/02* (2006.01)

(52) U.S. Cl.
CPC ............. *H04B 5/0081* (2013.01); *H04B 5/02* (2013.01)

(58) Field of Classification Search
CPC combination set(s) only.
See application file for complete search history.

(56) References Cited

U.S. PATENT DOCUMENTS

| | | |
|---|---|---|
| 2005/0184154 A1 | 8/2005 | Tanaka et al. |
| 2006/0043585 A1 | 3/2006 | Sukegawa et al. |
| 2011/0260786 A1 | 10/2011 | Kuroda |
| 2012/0227248 A1* | 9/2012 | Orihara ............ G06K 19/07749 29/593 |
| 2014/0015649 A1 | 1/2014 | Akiyama et al. |
| 2015/0242261 A1 | 8/2015 | Yamaguchi et al. |
| 2016/0173652 A1* | 6/2016 | Chai ................... H04W 80/085 709/230 |

FOREIGN PATENT DOCUMENTS

| | | |
|---|---|---|
| JP | 2005-244445 A | 9/2005 |
| JP | 2006-093659 A | 4/2006 |
| JP | 2010-103611 A | 5/2010 |
| JP | 2011-066515 A | 3/2011 |
| JP | 2012-128487 A | 7/2012 |
| WO | WO 2014/083780 A1 | 6/2014 |

* cited by examiner

*Primary Examiner* — Zhitong Chen
(74) *Attorney, Agent, or Firm* — Muncy, Geissler, Olds & Lowe, P.C.

(57) ABSTRACT

A signal bridge device is provided with a plurality of bridge signal transmission/reception units, a plurality of bridge signal transmission/reception terminals, and a bridge signal distribution unit. Non-contact reception signals received by the bridge signal transmission/reception units are input into the bridge signal distribution unit. Contact reception signals received by the bridge signal transmission/reception terminals are input into the bridge signal distribution unit. The bridge signal distribution unit can output the non-contact reception signals to the bridge signal transmission/reception terminals and can output the contact reception signals to the bridge signal transmission/reception units.

6 Claims, 3 Drawing Sheets

SIGNAL BRIDGE DEVICE

TECHNICAL FIELD

The present invention relates to a signal bridge device that allows transmission and reception of signals between a signal processing device that can transmit and receive signals without contact and a signal processing unit that cannot transmit and receive signals without contact.

BACKGROUND ART

Conventionally, there has been known a signal processing device that transmits and receives signals to and from an external signal transmission/reception unit without contact. The signal processing device has a signal transmission/reception coil instead of a signal terminal in a general signal processing device. Signals are transmitted and received by inductive coupling between the signal transmission/reception coil in the signal processing device and the signal transmission/reception coil in the external signal transmission/reception unit without contact. The signal transmission/reception device is described in Patent Document 1 or Patent Document 2.

Patent Document 1: Japanese Unexamined Patent Application, Publication No. 2010-103611

Patent Document 2: Japanese Unexamined Patent Application, Publication No. 2011-66515

DISCLOSURE OF THE INVENTION

Problems to be Solved by the Invention

However, Patent Document 1 and Patent Document 2 describe the coil layout and circuit configuration for transmitting and receiving signals to and from another signal transmission/reception unit (signal transmission/reception coil) without contact, but do not describe transmission and reception of signals between a signal processing device that can transmit and receive signals without contact and a signal processing unit that cannot transmit and receive signals without contact. Accordingly, there is a demand for a signal bridge device that allows transmission and reception of signals between a signal processing device that can transmit and receive signals without contact and an external signal processing unit that cannot transmit and receive signals without contact, the two of which transmit and receive signals by different methods. In addition, there is a demand for a signal bridge device that allows transmission and reception of signals between signal processing units that transmit and receive signals by different methods.

Further, Patent Document 1 and Patent Document 2 do not describe a device that is required in the case where the processable signals are different (for example, the standards for the processable signals are different) between one signal processing unit and the other signal processing unit. Accordingly, there is a demand for a device that allows transmission and reception of mutually processable signals between one signal processing unit and the other signal processing unit in the case where the processable signals are different between the one signal processing unit and the other signal processing unit.

In view of the foregoing circumstances, there is a demand for a device that allows a signal processing device that cannot transmit and receive signals directly to and from a signal processing device that transmits and receives signals without contact to transmit and receive signals to and from the signal processing device that transmits and receives signals without contact.

An object of the present invention is to provide a signal bridge device that allows an external signal processing device that cannot transmit and receive signals directly to and from a signal processing device that transmits and receives signals without contact to transmit and receive signals to and from the signal processing device that transmits and receives signals without contact.

Means for Solving the Problems

The present invention relates to a signal bridge device including: a plurality of first bridge signal transmission/reception units; a plurality of second bridge signal transmission/reception units; and a bridge signal distribution unit that is electrically connected to the plurality of first bridge signal transmission/reception units and is electrically connected to the second bridge signal transmission/reception units, wherein each of the plurality of first bridge signal transmission/reception units can transmit and receive signals to and from an external signal processing unit-side signal transmission/reception unit outside of the signal bridge device without contact by a predetermined method, each of the plurality of second bridge signal transmission/reception units can transmit and receive signals to and from an external signal transmission/reception unit outside of the signal bridge device without contact by a method different from the predetermined method or can transmit and receive signals to and from the external signal transmission/reception unit outside of the signal bridge device with contact, a reception signal U received by each of the plurality of first bridge signal transmission/reception units is input into the bridge signal distribution unit, a reception signal T received by each of the plurality of second bridge signal transmission/reception units is input into the bridge signal distribution unit, and the bridge signal distribution unit can output the reception signal U to each of the plurality of second bridge signal transmission/reception units and output the reception signal T to each of the plurality of first bridge signal transmission/reception units.

The reception signal T includes a reception signal T1, and the bridge signal distribution unit can output the reception signal T1 to, among the plurality of first bridge signal transmission/reception units, at least one first bridge signal transmission/reception unit that can transmit and receive signals to and from a signal processing unit that can process the reception signal T1.

The signal processing unit can process a signal including first identification data, and the bridge signal distribution unit can output the reception signal T1 to the at least one first bridge signal transmission/reception unit by outputting the reception signal T1 to the at least one first bridge signal transmission/reception unit when the reception signal T1 includes the first identification data.

The signal bridge device further includes a bridge signal distribution instruction unit, the bridge signal distribution unit has a plurality of switches, the bridge signal distribution instruction unit outputs a switch open/close instruction signal for instructing the open/close state of each of the plurality of switches, and the bridge signal distribution unit can output the reception signal T1 to the one first bridge signal transmission/reception unit by opening and closing the plurality of switches based on the switch open/close instruction signal.

The reception signal T includes a reception signal T1, the bridge signal distribution unit can convert the reception signal T1 so that a signal processing unit capable of transmitting and receiving signals to and from at least one of the plurality of first bridge signal transmission/reception units can process the reception signal T1, and can output the converted reception signal T1 to at least one of the plurality of first bridge signal transmission/reception units that can transmit and receive signals to and from the signal processing unit.

The reception signal U includes a reception signal U2, and the bridge signal distribution unit can output the reception signal U2 to, among the plurality of second bridge signal transmission/reception units, at least one second bridge signal transmission/reception unit that can transmit and receive signals to and from an external signal processing unit that can process the reception signal U2.

The external signal processing unit can process a signal including second identification data, and the bridge signal distribution unit can output the reception signal U2 to the at least one second bridge signal transmission/reception unit by outputting the reception signal U2 to the at least one second bridge signal transmission/reception unit when the reception signal U2 includes the second identification data.

The signal bridge device further includes a bridge signal distribution instruction unit, the bridge signal distribution unit has a plurality of switches, the bridge signal distribution instruction unit outputs a switch open/close instruction signal for instructing the open/close state of each of the plurality of switches, and the bridge signal distribution unit can output the reception signal U2 to the at least one second bridge signal transmission/reception unit by opening and closing the plurality of switches based on the switch open/close instruction signal.

The reception signal U includes a reception signal U2, and the bridge signal distribution unit can convert the reception signal U2 so that an external signal processing unit capable of transmitting and receiving signals to and from at least one of the plurality of second bridge signal transmission/reception units can process the reception signal U2, and can output the converted reception signal U2 to at least one of the plurality of first bridge signal transmission/reception units that can transmit and receive signals to and from the external signal processing unit.

The plurality of first bridge signal transmission/reception units is bridge signal transmission/reception coils formed by wires, the predetermined method is a method using inductive coupling, and the bridge signal transmission/reception coils can transmit and receive signals to and from an external signal transmission/reception unit by inductive coupling.

The present invention relates to a signal bridge device including: a plurality of first bridge signal transmission/reception units; a plurality of second bridge signal transmission/reception units; and a bridge signal distribution unit that is electrically connected to the plurality of first bridge signal transmission/reception units and is electrically connected to the plurality of second bridge signal transmission/reception units, wherein each of the plurality of first bridge signal transmission/reception units can transmit and receive signals to and from an external signal processing unit-side signal transmission/reception unit outside of the signal bridge device without contact, each of the plurality of second bridge signal transmission/reception units can transmit and receive signals to and from an external signal transmission/reception unit outside of the signal bridge device without contact or with contact, a reception signal U received by each of the plurality of first bridge signal transmission/reception units is input into the bridge signal distribution unit, a reception signal T received by each of the plurality of second bridge signal transmission/reception units is input into the bridge signal distribution unit, the bridge signal distribution unit can output the reception signal U to each of the plurality of second bridge signal transmission/reception units and can output the reception signal T to each of the plurality of first bridge signal transmission/reception units, the reception signal T includes a reception signal T1, the reception signal U includes a reception signal U2, and the bridge signal distribution unit converts the reception signal T1 so that a signal processing unit capable of transmitting and receiving signals to and from at least one of the plurality of first bridge signal transmission/reception units can process the reception signal T1, outputs the converted reception signal T1 to at least one of the plurality of first bridge signal transmission/reception units that can transmit and receive signals to and from the signal processing unit, converts the reception signal U2 so that an external signal processing unit capable of transmitting and receiving signals to and from at least one of the plurality of second bridge signal transmission/reception units can process the reception signal U2, and outputs the converted reception signal U2 to at least one of the plurality of first bridge signal transmission/reception units that can transmit and receive signals to and from the external signal processing unit.

The present invention also relates to a signal bridge processing system including: the signal bridge device; an interposer unit that has a plurality of external signal processing unit-side signal transmission/reception units as the plurality of external signal transmission/reception units and a plurality of signal processing device-side signal transmission/reception units that are electrically connected to the plurality of external signal processing unit-side signal transmission/reception units; a signal processing device that can transmit and receive signals to and from the plurality of signal processing device-side signal transmission/reception units; and an external signal processing unit that has the plurality of external signal transmission/reception units, wherein the signal processing device and the external signal processing unit can transmit and receive signals to and from each other via the signal bridge device and the interposer unit.

The present invention also relates to a signal bridge processing system including: the signal bridge device; a signal processing device that can transmit and receive signals to and from the plurality of signal processing device-side signal transmission/reception units; and an external signal processing unit that has the plurality of external signal transmission/reception units, wherein the signal processing device and the external signal processing unit transmit and receive signals to and from each other via the signal bridge device.

Effects of the Invention

According to the present invention, it is possible to provide a signal bridge device that allows an external signal processing device that cannot transmit and receive signals directly to and from a signal processing device that transmits and receives signals without contact to transmit and receive signals to and from the signal processing device that transmits and receives signals without contact.

BRIEF DESCRIPTION OF THE DRAWINGS

FIG. 2A illustrates a first signal transmission/reception coil 13A, FIG. 2B illustrates a first signal processing device-side coil 41A and a first external signal processing unit-side coil 41B in an interposer unit 40, and FIG. 2C illustrates a first bridge signal transmission/reception coil 33A and a first bridge signal transmission/reception terminal 31A.

FIG. 3A is a plan view and FIG. 3B is a cross-sectional view taken along line A-A.

PREFERRED MODE FOR CARRYING OUT THE INVENTION

Figure 1:
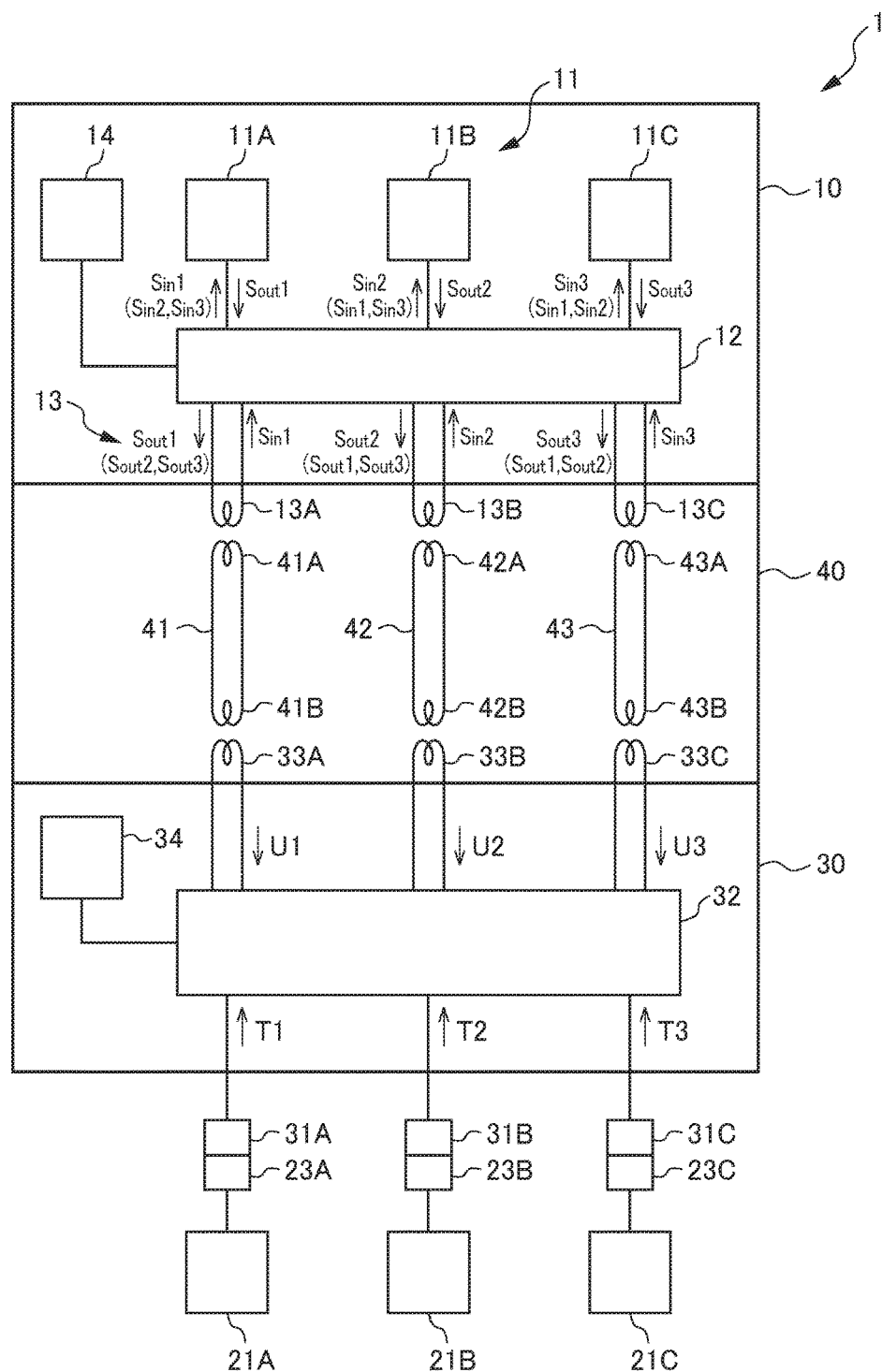
FIG. 1 is a block diagram of a signal bridge processing system 1 in an embodiment of the present invention.

An embodiment of the present invention will be described below with reference to FIG. 1. FIG. 1 is a block diagram of a signal bridge processing system 1 in the embodiment of the present invention.

In the following description, "transmitting and receiving signals without contact" means that one transmission/reception unit transmitting and receiving signals and the other transmission/reception unit transmitting and receiving signals transmit and receive signals to and from each other without contact and without intervention of a conductive member (one or more of solder, a conductive adhesive, and a wire). In addition, "transmitting and receiving signals with contact" means that one transmission/reception unit transmitting and receiving signals and the other transmission/reception units transmitting and receiving signals transmit and receive signals to and from each other in contact with each other or with intervention of a conductive member (solder, a conductive adhesive, or a wire).

As illustrated in FIG. 1, the signal bridge processing system 1 includes a signal processing device 10, external signal processing units 21, a signal bridge device 30, and an interposer unit 40.

The signal processing device 10 includes a signal processing unit 11, a signal distribution unit 12, a signal transmission/reception coil 13 as a signal transmission/reception unit, and a signal distribution instruction unit 14.

The signal processing unit 11 includes three (a plurality of) signal processing units, that is, a first signal processing unit 11A, a second signal processing unit 11B, and a third signal processing unit 11C.

The signal transmission/reception coil 13 as the signal transmission/reception unit includes three (a plurality of) signal transmission/reception coils, that is, a first signal transmission/reception coil 13A (a first signal transmission/reception unit), a second signal transmission/reception coil 13B (a second signal transmission/reception unit), and a third signal transmission/reception coil 13C (a third signal transmission/reception unit).

The first signal processing unit 11A, the second signal processing unit 11B, and the third signal processing unit 11C are electrically connected to the signal distribution unit 12. The first signal transmission/reception coil 13A, the second signal transmission/reception coil 13B, and the third signal transmission/reception coil 13C are electrically connected to the signal distribution unit 12. The signal distribution instruction unit 14 is electrically connected to the signal distribution unit 12.

The external signal processing unit 21 includes three (a plurality of) external signal processing units, that is, a first external signal processing unit 21A, a second external signal processing unit 21B, and a third external signal processing unit 21C. The external signal processing unit 21 is electrically connected to an external signal transmission/reception terminal 23 as an external signal transmission/reception unit. More specifically, the first external signal processing unit 21A is electrically connected to a first external signal transmission/reception terminal 23A, the second external signal processing unit 21B is electrically connected to a second external signal transmission/reception terminal 23B, and the third external signal processing unit 21C is electrically connected to a third external signal transmission/reception terminal 23C.

The signal bridge device 30 includes a bridge signal transmission/reception terminal 31 as a second bridge signal transmission/reception unit, a bridge signal distribution unit 32, a bridge signal transmission/reception coil 33 as a first bridge signal transmission/reception unit, and a bridge signal distribution instruction unit 34.

The bridge signal transmission/reception terminal 31 as the second bridge signal transmission/reception unit includes three (a plurality of) signal transmission/reception terminals, that is, a first bridge signal transmission/reception terminal 31A, a second bridge signal transmission/reception terminal 31B, and a third bridge signal transmission/reception terminal 31C. The bridge signal transmission/reception coil 33 as the first bridge signal transmission/reception unit includes three (a plurality of) bridge signal transmission/reception coils, that is, a first bridge signal transmission/reception coil 33A, a second bridge signal transmission/reception coil 33B, and a third bridge signal transmission/reception coil 33C.

The first bridge signal transmission/reception terminal 31A, the second bridge signal transmission/reception terminal 31B, and the third bridge signal transmission/reception terminal 31C are electrically connected to the bridge signal distribution unit 32. The first bridge signal transmission/reception coil 33A, the second bridge signal transmission/reception coil 33B, and the third bridge signal transmission/reception coil 33C are electrically connected to the bridge signal distribution unit 32.

The interposer unit 40 has three (a plurality of) signal paths (a first signal path 41, a second signal path 42, and a third signal path 43), three (a plurality of) signal processing device-side coils as signal processing device-side transmission/reception units (a first signal processing device-side coil 41A, a second signal processing device-side coil 42A, and a third signal processing device-side coil 43A), and three (a plurality of) external signal processing unit-side coils (a first external signal processing unit-side coil 41B, a second external signal processing unit-side coil 42B, and a third external signal processing unit-side coil 43B).

One end of the first signal path 41 is electrically connected to the first signal processing device-side coil 41A (the first signal processing device-side transmission/reception unit), and the other end of the first signal path 41 is electrically connected to the first external signal processing unit-side coil 41B (the first external signal processing device-side transmission/reception unit). One end of the second signal path 42 is electrically connected to the second signal processing device-side coil 42A (the second signal processing device-side transmission/reception unit), and the other end of the second signal path 42 is electrically connected to the second external signal processing unit-side coil 42B (the second external signal processing device-side transmission/reception unit). One end of the third signal path 43 is electrically connected to the third signal processing device-side coil 43A (the third signal processing device-side transmission/reception unit), and the other end of the third signal path 43 is electrically connected to the third external signal processing unit-side coil 43B (the third external signal processing device-side transmission/reception unit).

The first signal processing unit 11A, the second signal processing unit 11B, and the third signal processing unit 11C are signal processing units that perform respective predetermined signal processing. More specifically, the signal processing units perform predetermined processing on input signals and perform predetermined processing based on input signals. The signals processed by the signal processing units are output as output signals as necessary. Referring to FIG. 1, the first signal processing unit 11A, the second signal processing unit 11B, and the third signal processing unit 11C are signal processing units that are built in one package (for example, in the embodiment, a semiconductor chip acting as the signal processing device 10).

The first signal transmission/reception coil 13A can transmit and receive signals to and from the first signal processing device-side coil 41A without contact. More specifically, the first signal transmission/reception coil 13A can transmit and receive signals to and from the first signal processing device-side coil 41A by inductive coupling between the first signal transmission/reception coil 13A and the first signal processing device-side coil 41A. The foregoing matter also applies to the relationship between the second signal transmission/reception coil 13B and the second signal processing device-side coil 42A and the relationship between the third signal transmission/reception coil 13C and the third signal processing device-side coil 43A.

A plurality of reception signals is input into the signal distribution unit 12, that is, a first reception signal Sin1 received by the first signal transmission/reception coil 13A, a second reception signal Sin2 received by the second signal transmission/reception coil 13B, and a third reception signal Sin3 received by the third signal transmission/reception coil 13C. A plurality of output signals is input into the signal distribution unit 12, that is, a first output signal Sout1 output by the first signal processing unit 11A, a second output signal Sout2 output by the second signal processing unit 11B, and a third output signal Sout3 output by the third signal processing unit 11C.

The signal distribution instruction unit 14 provides instructions to the signal distribution unit 12. The signal distribution unit 12 can operate under instructions from the signal distribution instruction unit 14. The signal distribution unit 12 can also operate autonomously without instructions from the signal distribution instruction unit 14.

The signal distribution unit 12 can output the first reception signal Sin1, the second reception signal Sin2, and the third reception signal Sin3 to the first signal processing unit 11A, the second signal processing unit 11B, and the third signal processing unit 11C. The signal distribution unit 12 can output the first output signal Sout1, the second output signal Sout2, and the third output signal Sout3 to the first signal transmission/reception coil 13A, the second signal transmission/reception coil 13B, and the third signal transmission/reception coil 13C.

The first external signal processing unit 21A, the second external signal processing unit 21B, and the third external signal processing unit 21C are signal processing units that perform respective predetermined signal processing. More specifically, the external signal processing units perform predetermined processing on input signals and perform predetermined processing based on input signals. The signals processed by the external signal processing units are output as output signals as necessary. Referring to FIG. 1, the first external signal processing unit 21A, the second external signal processing unit 21B, and the third external signal processing unit 21C are signal processing units that are built in respective independent packages (for example, semiconductor chips).

The first external signal transmission/reception terminal 23A can transmit and receive signals to and from the first bridge signal transmission/reception terminal 31A with contact. The foregoing matter also applies to the relationship between the second external signal transmission/reception terminal 23B and the second bridge signal transmission/reception terminal 31B and the relationship between the third external signal transmission/reception terminal 23C and the third bridge signal transmission/reception terminal 31C.

The first bridge signal transmission/reception coil 33A can transmit and receive signals to and from the first external signal processing unit-side coil 41B without contact. More specifically, the first bridge signal transmission/reception coil 33A can transmit and receive signals to and from the first external signal processing unit-side coil 41B by inductive coupling with the first external signal processing unit-side coil 41B. That is, the first bridge signal transmission/reception coil 33A and the first external signal processing unit-side coil 41B can transmit and receive signals to and from each other by a method using inductive coupling as a predetermined method. The foregoing matter also applies to the relationship between the second bridge signal transmission/reception coil 33B and the second external signal processing unit-side coil 42B and the relationship between the third bridge signal transmission/reception coil 33C and the third external signal processing unit-side coil 43B.

A plurality of non-contact reception signals as a plurality of reception signals U is input into the bridge signal distribution unit 32, that is, a first non-contact reception signal U (reception signal U1) received by the first bridge signal transmission/reception coil 33A, a second non-contact reception signal U2 (reception signal U2) received by the second bridge signal transmission/reception coil 33B, and a third non-contact reception signal U3 (reception signal U3) received by the third bridge signal transmission/reception coil 33C. In addition, a plurality of contact reception signals as a plurality of reception signals T is input into the bridge signal distribution unit, that is, a first contact reception signal T1 (reception signal T1) received by the first bridge signal transmission/reception terminal 31A, a second contact reception signal T2 (reception signal T2) received by the second bridge signal transmission/reception terminal 31B, and a third contact reception signal T3 (reception signal T3) received by the third bridge signal transmission/reception terminal 31C.

The bridge signal distribution instruction unit 34 provides instructions to the bridge signal distribution unit 32. The bridge signal distribution unit 32 can operate under instructions from the bridge signal distribution instruction unit 34. The bridge signal distribution unit 32 can also operate autonomously without instructions from the bridge signal distribution instruction unit 34.

The bridge signal distribution unit 32 can output the first non-contact reception signal U1, the second non-contact reception signal U2, and the third non-contact reception signal U3 to the first bridge signal transmission/reception terminal 31A, the second bridge signal transmission/reception terminal 31B, and the third bridge signal transmission/reception terminal 31C. The bridge signal distribution unit 32 can also output the first contact reception signal T1, the second contact reception signal T2, and the third contact reception signal T3 to the first bridge signal transmission/reception coil 33A, the second bridge signal transmission/reception coil 33B, and the third bridge signal transmission/reception coil 33C.

An example of operations of the signal bridge processing system 1 of the embodiment will be described with reference to FIG. 1. First, the flow of the first contact reception signal T1 received by the first external signal transmission/reception terminal 23A will be described.

As illustrated in FIG. 1, the first external signal transmission/reception terminal 23A receives the first contact reception signal T1. The first contact reception signal T1 is a signal output from the first external signal processing unit 21A. The second external signal transmission/reception terminal 23B receives the second contact reception signal T2. The second contact reception signal T2 is a signal output from the second external signal processing unit 21B. The third external signal transmission/reception terminal 23C receives the third contact reception signal T3. The third contact reception signal T3 is a signal output from the third external signal processing unit 21C.

The first contact reception signal T1 received by the first external signal transmission/reception terminal 23A is input into the bridge signal distribution unit 32.

As described above, the bridge signal distribution unit 32 can output the first contact reception signal T1 to each of the first bridge signal transmission/reception coil 33A, the second bridge signal transmission/reception coil 33B, and the third bridge signal transmission/reception coil 33C. In the embodiment, the bridge signal distribution unit 32 outputs the first contact reception signal T1 to each of the first bridge signal transmission/reception coil 33A, the second bridge signal transmission/reception coil 33B, and the third bridge signal transmission/reception coil 33C.

The flow of the first contact reception signal T1 output from the first bridge signal transmission/reception coil 33A in the embodiment will be further described. The first contact reception signal T1 is received as a first reception signal Sin1 by the first signal transmission/reception coil 13A via the first bridge signal transmission/reception coil 33A, the first external signal processing unit-side coil 41B, the first signal path 41, and the first signal processing device-side coil 41A.

As described above, the signal distribution unit 12 can output the first reception signal Sin1 to each of the first signal processing unit 11A, the second signal processing unit 11B, and the third signal processing unit 11C. In the embodiment, the signal distribution unit 12 outputs the first reception signal Sin1 to each of the first signal processing unit 11A, the second signal processing unit 11B, and the third signal processing unit 11C.

The first signal processing unit 11A, the second signal processing unit 11B, and the third signal processing unit 11C are signal processing units in conformity with specific standards. When input signals are standardized signals, the first signal processing unit 11A, the second signal processing unit 11B, and the third signal processing unit 11C perform predetermined processing on the input signal or perform predetermined processing based on the input signals. The first external signal processing unit 21A, the second external signal processing unit 21B, and the third external signal processing unit 21C are signal processing units in conformity with the specific standards and output standardized signals.

For example, when the input signal includes first identification data Rid1, the first signal processing unit 11A processes the input signal, and when the input signal does not include the first identification data Rid1, the first signal processing unit 11A does not process the input signal. Similarly, when the input signal includes second identification data Rid2 as predetermined identification data, the second signal processing unit 11B processes the input signal, and when the input signal does not include the second identification data Rid2, the second signal processing unit 11B does not process the input signal. Similarly, when the input signal includes third identification data Rid3 as predetermined identification data, the third signal processing unit 11C processes the input signal, and when the input signal does not include the third identification data Rid3, the third signal processing unit 11C does not process the input signal.

The first reception signal Sin1 (first contact reception signal T1) includes the first identification data Rid1. The first reception signal Sin1 (first contact reception signal T1) does not include the second identification data Rid2 and the third identification data Rid3. Accordingly, the first signal processing unit 11A processes the input first reception signal Sin1. The second signal processing unit 11B and the third signal processing unit 11C do not process the input first reception signal Sin1 (first contact reception signal T1). The first reception signal Sin1 (first contact reception signal T1) may include the second identification data Rid2 and/or the third identification data Rid3 as well. In this case, the second signal processing unit 11B and/or the third signal processing unit 11C process the first reception signal Sin1 (first contact reception signal T1).

In this manner, the signal distribution unit 12 outputs the first reception signal Sin1 (first contact reception signal T1) to the first signal processing unit 11A such that the first signal processing unit 11A can process the first reception signal Sin1 (first contact reception signal T1).

In addition, the bridge signal distribution unit 32 outputs the first contact reception signal T1 to, among the plurality of first bridge signal transmission/reception units (the first bridge signal transmission/reception coil 33A, the second bridge signal transmission/reception coil 33B, and the third bridge signal transmission/reception coil 33C), the first bridge signal transmission/reception coil 33A that can transmit and receive signals to and from the first signal processing unit 11A that can process the first contact reception signal T1.

Here, the case in which the first reception signal Sin1 (the first contact reception signal T1) received by the first signal transmission/reception coil 13A is processed by the first signal processing unit 11A has been described. However, the signal distribution unit 12 can output the first reception signal Sin1 (the first contact reception signal T1) to the first signal processing unit 11A even when the first reception signal Sin1 (the first contact reception signal T1) is a signal to be received by the second signal transmission/reception coil 13B or the third signal transmission/reception coil 13C.

As described above, even when the signal processing apparatus 10 receiving specific standardized signals on one side has only the signal transmission/reception coil 13 and the first external signal processing unit 21A receiving specific standardized signals on the other side has only the first external signal transmission/reception terminal 23A, the use of the signal bridge device 30 allows the signal processing apparatus 10 and the first external signal processing unit 21A to transmit and receive signals to and from each other. Accordingly, the signal bridge device 30 provides the advantage of allowing transmission and reception of signals between a signal processing device (the signal processing apparatus 10) that can transmit and receive signals without contact and a signal processing unit (the first external signal processing unit 21A) that cannot transmit and receive signals without contact.

The foregoing description of the first reception signal Sin1 (first contact reception signal T1) also applies to the second reception signal Sin2 (second contact reception signal T2) and the third reception signal Sin3 (third contact reception signal T3).

Next, the flow of the second non-contact reception signal U2 received by the second bridge signal transmission/reception coil 33B will be described. As illustrated in FIG. 1, the second non-contact reception signal U2 is configured such that the second output signal Sout2 output from the second signal transmission/reception coil 13B is received by the second external signal processing unit 21B via the second signal processing device-side coil 42A, the second signal path 42, the second external signal processing unit-side coil 42B, and the second bridge signal transmission/reception coil 33B. Therefore, first, the flow until when the second output signal Sout2 is output from the second signal transmission/reception coil 13B will be described.

As illustrated in FIG. 1, the first signal processing unit 11A outputs the first output signal Sout1. The second signal processing unit 11B outputs the second output signal Sout2. The third signal processing unit 11C outputs the third output signal Sout3. The second output signal Sout2 output from the second signal processing unit 11B is input into the signal distribution unit 12.

As described above, the signal distribution unit 12 can output the second output signal Sout2 to each of the first signal transmission/reception coil 13A, the second signal transmission/reception coil 13B, and the third signal transmission/reception coil 13C. In the embodiment, the second output signal Sout2 is output to each of the first signal transmission/reception coil 13A, the second signal transmission/reception coil 13B, and the third signal transmission/reception coil 13C. Therefore, the second output signal Sout2 is output from the second signal transmission/reception coil 13B.

The second output signal Sout2 output from the second signal transmission/reception coil 13B is received as the second non-contact reception signal U2 by the second bridge signal transmission/reception coil 33B via the second signal processing device-side coil 42A, the second signal path 42, and the second external signal processing unit-side coil 42B. Similarly, the first output signal Sout1 output from the first signal transmission/reception coil 13A is received as the first non-contact reception signal U1 by the first bridge signal transmission/reception coil 33A via the first signal processing device-side coil 41A, the first signal path 41, and the first external signal processing unit-side coil 41B. The third output signal Sout3 output from the third signal transmission/reception coil 13C is received as the third non-contact reception signal U3 by the third bridge signal transmission/reception coil 33C via the third signal processing device-side coil 43A, the third signal path 43, and the third external signal processing unit-side coil 43B.

The second non-contact reception signal U2 received by the second bridge signal transmission/reception coil 33B is input into the bridge signal distribution unit 32.

As described above, the bridge signal distribution unit 32 can output the first non-contact reception signal U1, the second non-contact reception signal U2, and the third non-contact reception signal U3 to the first bridge signal transmission/reception terminal 31A, the second bridge signal transmission/reception terminal 31B, and the third bridge signal transmission/reception terminal 31C. In the embodiment, the bridge signal distribution unit 32 outputs the second non-contact reception signal U2 to each of the first bridge signal transmission/reception terminal 31A, the second bridge signal transmission/reception terminal 31B, and the third bridge signal transmission/reception terminal 31C.

Here, the first external signal processing unit 21A, the second external signal processing unit 21B, and the third external signal processing unit 21C are signal processing units in conformity with specific standards. When the input signals are standardized signals, the first external signal processing unit 21A, the second external signal processing unit 21B, and the third external signal processing unit 21C perform predetermined processing on the input signals or perform predetermined processing based on the input signals.

For example, when the input signal includes the first identification data Rid1, the first external signal processing unit 21A processes the input signal, and when the input signal does not include the first identification data Rid1, the first external signal processing unit 21A does not process the input signal. Similarly, when the input signal includes the second identification data Rid2 as predetermined identification data, the second external signal processing unit 21B processes the input signal, and when the input signal does not include the second identification data Rid2, the second external signal processing unit 21B does not process the input signal. Similarly, when the input signal includes the third identification data Rid3 as predetermined identification data, the third external signal processing unit 21C processes the input signal, and when the input signal does not include the third identification data Rid3, the third external signal processing unit 21C does not process the input signal.

The second non-contact reception signal U2 (the second output signal Sout2) includes the second identification data Rid2. The second non-contact reception signal U2 (the second output signal Sout2) does not include the first identification data Rid1 and the third identification data Rid3. Accordingly, the second external signal processing unit 21B processes the input second non-contact reception signal U2 (the second output signal Sout2). The first external signal processing unit 21A and the third external signal processing unit 21C do not process the input second non-contact reception signal U2 (the second output signal Sout2). The second non-contact reception signal U2 (the second output signal Sout2) may include the first identification data Rid1 and/or the third identification data Rid3. In this case, the first external signal processing unit 21A and/or the third external signal processing unit 21C process the second output signal Sout2.

In this way, the bridge signal distribution unit 32 outputs the second non-contact reception signal U2 to, among the plurality of second bridge signal transmission/reception units (the first bridge signal transmission/reception terminal 31A, the second bridge signal transmission/reception terminal 31B, and the third bridge signal transmission/reception terminal 31C), the second bridge signal transmission/reception terminal 31B that can transmit and receive signals to and from the second external signal processing unit 21B that can process the second non-contact reception signal U2.

As described above, even when the signal processing apparatus 10 transmitting and receiving specific standardized signals on one side has only the signal transmission/reception coil 13 and the second external signal processing unit 21B transmitting and receiving specific standardized signals on the other side has only the external signal transmission/reception terminal 23, the use of the signal bridge device 30 allows the signal processing apparatus 10 and the first external signal processing unit 21A to transmit and receive signals to and from each other. Accordingly, the signal bridge device 30 provides the advantage of allowing transmission and reception of signals between a signal processing device (the signal processing apparatus 10) that can transmit and receive signals without contact and a signal processing unit (the first external signal processing unit 21A) that cannot transmit and receive signals without contact. Therefore, the signal bridge device 30 allows the external signal processing unit 21 that cannot transmit and receive signals directly to and from the signal processing apparatus 10 transmitting and receiving signals without contact to transmit and receive signals to and from the signal processing apparatus 10.

The foregoing description is about the second output signal Sout2 (the second non-contact reception signal U2). However, the foregoing description is also applicable to the first output signal Sout1 (the first non-contact reception signal U1) and the third output signal Sout3 (the third non-contact reception signal U3).

As described above, in the signal bridge processing system 1 of the embodiment, the signal processing device 10 and the external signal processing units 21 (the first external signal processing unit 21A, the second external signal processing unit 21B, and the third external signal processing unit 21C) transmit and receive signals to and from each other via the signal bridge device 30 and the interposer unit 40.

Figure 2A:
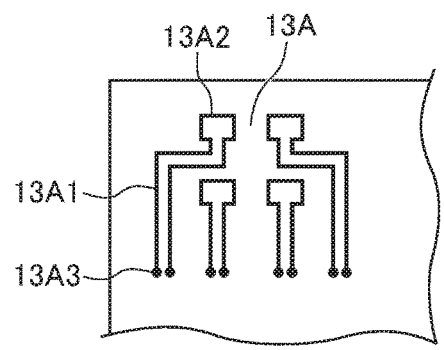
FIGS. 2A to 2C are diagrams for describing transmission/reception coils and signal transmission/reception terminals in the embodiment of the present invention.
Figure 2B:
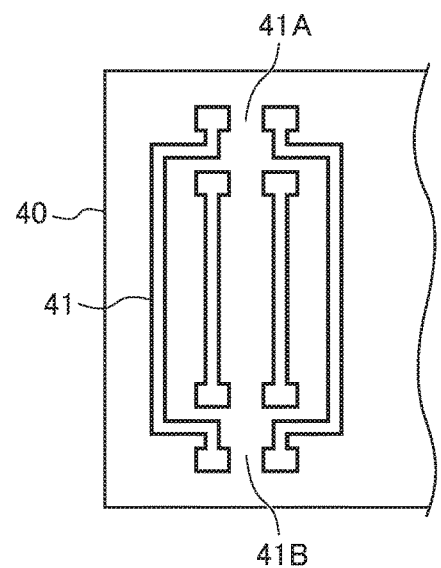
Figure 2C:
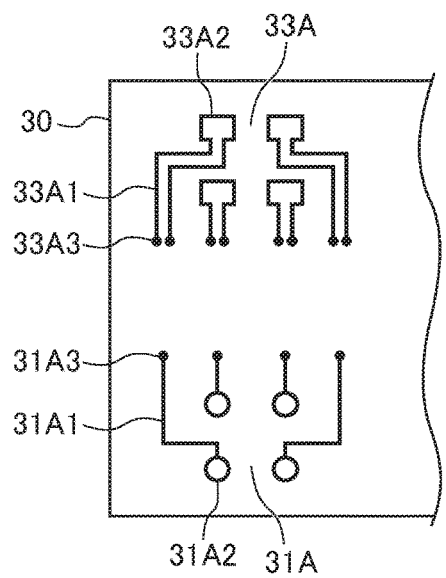

Next, configurations of the signal transmission/reception coils in the signal processing device 10, the interposer unit 40, and the signal bridge device 30 will be described with reference to FIGS. 2A to 2C. FIGS. 2A to 2C are diagrams describing transmission/reception coils in the embodiment of the present invention. FIG. 2A illustrates the first signal transmission/reception coil 13A, FIG. 2B illustrates the first signal processing device-side coil 41A and the first external signal processing unit-side coil 41B in the interposer unit 40, and FIG. 2C illustrates the first bridge signal transmission/ reception coil 33A and the first bridge signal transmission/ reception terminal 31A.

As illustrated in FIG. 2A, the first signal transmission/ reception coil 13A includes a wire 13A1 and a single winding of coil 13A2 formed by the wire 13A1 at one end of the wire 13A1. The other end of the wire 13A1 is connected to a via hole 13A3. As illustrated in FIG. 2A, three (a plurality of) signal transmission/reception coils configured in the same manner as described above are arranged in the vicinity of the first signal transmission/ reception coil 13A. The second signal transmission/reception coil 13B and the third signal transmission/reception coil 13C are configured in the same manner as described above.

As illustrated in FIG. 2B, the first signal processing device-side coil 41A and the first external signal processing unit-side coil 41B include a first signal path 41 formed by the wire and single windings of coils 41A1 and 41B formed by the wire. As illustrated in FIG. 2B, three (a plurality of) signal reception coils configured in the same manner as described are arranged in the vicinity of the first signal processing device-side coil 41A and the first external signal processing unit-side coil 41B. The second signal processing device-side coil 42A and the second external signal processing unit-side coil 42B, and the third signal processing device-side coil 43A and the third external signal processing unit-side coil 43B are configured in the same manner as described above.

As illustrated in FIG. 2C, the first bridge signal transmission/reception coil 33A includes a wire 33A1 and a single winding of coil 33A2 formed by the wire 33A1 at one end of the wire 33A1. The other end of the wire 33A1 is connected to a via hole 33A3. As illustrated in FIG. 2C, three (a plurality of) external signal transmission/reception coils configured in the same manner are arranged in the vicinity of the first bridge signal transmission/reception coil 33A. The second bridge signal transmission/reception coil 33B and the third bridge signal transmission/reception coil 33C are configured in the same manner as described above.

As illustrated in FIG. 2C, the first bridge signal transmission/reception terminal 31A includes a wire 31A1 and a terminal pad 31A2 formed at one end of the wire 31A1. The other end of the wire 31A1 is connected to a via hole 31A3. As illustrated in FIG. 2C, three (a plurality of) signal transmission/reception coils configured in the same manner are arranged in the vicinity of the first bridge signal transmission/reception terminal 31A. The second bridge signal transmission/reception terminal 31B and the third bridge signal transmission/reception terminal 31C are configured in the same manner as described above.

Figure 3A:
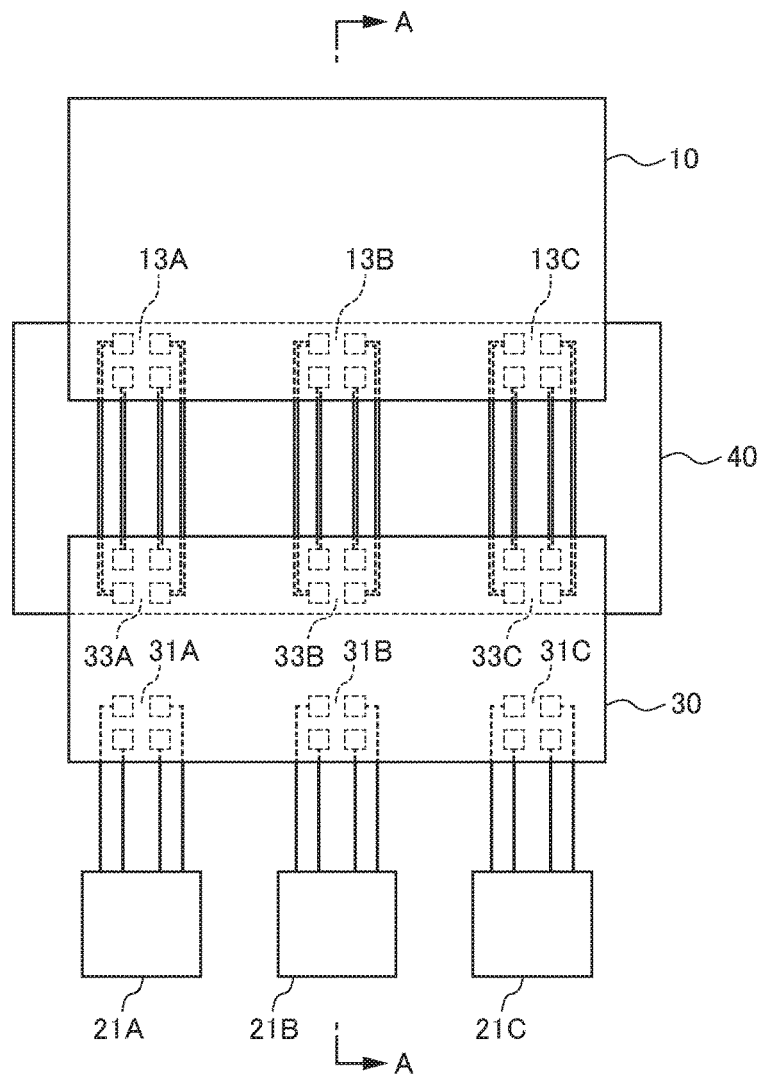
FIGS. 3A and 3B are diagrams of the signal bridge processing system 1 in the embodiment of the present invention.
Figure 3B:
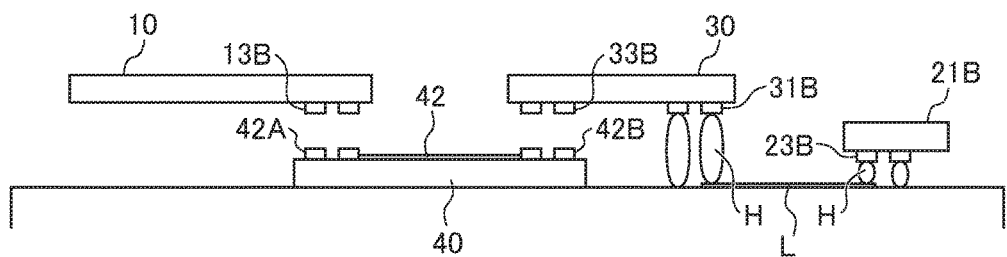

Next, the layout of the signal processing device 10, the interposer unit 40, the signal bridge device 30, and the external signal processing unit 21 will be described with reference to FIGS. 3A and 3B. FIGS. 3A and 3B are diagrams of the signal bridge processing system 1 in the embodiment of the present invention. FIG. 3A is a plan view and FIG. 3B is a cross-sectional view taken along line A-A.

As illustrated in FIGS. 3A and 3B, the signal processing device 10 and the interposer unit 40 are arranged such that the signal transmission/reception coils 13 (the first signal transmission/reception coil 13A to the third signal transmission/reception coil 13C) in the signal processing device 10 and the signal processing device-side coils (the first signal processing device-side coil 41A to the third signal processing device-side coil 43A) in the interposer unit 40 are opposed to each other. As illustrated in FIG. 3B, the signal transmission/reception coils 13 (the first signal transmission/ reception coil 13A to the third signal transmission/reception coil 13C) and the signal processing device-side coils (the first signal processing device-side coil 41A to the third signal processing device-side coil 43A) are separated from each other without contact. The signal transmission/reception coils 13 (the first signal transmission/reception coil 13A to the third signal transmission/reception coil 13C) and the signal processing device-side coils (the first signal processing device-side coil 41A to the third signal processing device-side coil 43A) can transmit and receive signals to and from each other by inductive coupling.

The interposer unit 40 and the signal bridge device 30 are arranged such that the external signal processing unit-side coils 41B to 43B and the bridge signal transmission/reception coils 33A to 33C are opposed to each other. As illustrated in FIG. 3B, the external signal processing unit-side coils 41B to 43B and the bridge signal transmission/reception coils 33A to 33C are separated from each other without contact. The external signal processing unit-side coils 41B to 43B and the bridge signal transmission/reception coils 33A to 33C can transmit and receive signals to and from each other by inductive coupling.

In addition, as illustrated in FIGS. 3A and 3B, the bridge signal transmission/reception terminals (the first bridge signal transmission/reception terminal 31A to the third bridge signal transmission/reception terminal 31C) in the signal bridge device 30 and the signal transmission/reception terminals (the first external signal transmission/reception terminal 23A to the third external signal transmission/reception terminal 23C) in the external signal processing unit 21 are electrically connected to each other via solder H and a line L. That is, the bridge signal transmission/reception terminals (the first bridge signal transmission/reception terminal 31A to the third bridge signal transmission/reception terminal 31C) and the signal transmission/reception terminals (the first external signal transmission/reception terminal 23A to the third external signal transmission/reception terminal 23C) can transmit and receive signals to and from each other with contact.

In the embodiment, the signal distribution unit 12 outputs the first reception signal Sin1 to each of the first signal processing unit 11A, the second signal processing unit 11B, and the third signal processing unit 11C. However, the present invention is not limited to this. When the first reception signal Sin1 includes the first identification data Rid1, the signal distribution unit 12 may output the first reception signal Sin1 to the first signal processing unit 11A, and when the first reception signal Sin1 does not include the first identification data Rid1, the signal distribution unit 12 may not output the first reception signal Sin1 to the first signal processing unit 11A. In this case, the signal distribution unit 12 outputs the first reception signal Sin1 to the first signal processing unit 11A such that the first signal processing unit 11A can process the first reception signal Sin1 by outputting the first reception signal Sin1 to the first signal processing unit 11A when the first reception signal Sin1 includes the first identification data Rid1.

The signal distribution unit 12 outputs the second output signal Sout2 to each of the first signal transmission/reception coil 13A, the second signal transmission/reception coil 13B, and the third signal transmission/reception coil 13C. However, the present invention is not limited to this. When the second output signal Sout2 includes the second identification data Rid2, the signal distribution unit 12 may output the second output signal Sout2 to the second signal transmission/reception coil 13B, and when the second output signal Sout2 does not include the second identification data Rid2, the signal distribution unit 12 may not output the second output signal Sout2 to the second signal transmission/reception coil 13B. In this case, the signal distribution unit 12 outputs the second output signal Sout2 to the second signal transmission/reception coil 13B such that the second external signal processing unit 21B can process the second output signal Sout2 by outputting the second output signal Sout2 to the second signal transmission/reception coil 13B when the second output signal Sout2 includes the second identification data Rid2.

In the embodiment, the bridge signal distribution unit 32 outputs the first contact reception signal T1 to each of the first bridge signal transmission/reception coil 33A, the second bridge signal transmission/reception coil 33B, and the third bridge signal transmission/reception coil 33C. However, the present invention is not limited to this. When the first contact reception signal T1 (the first reception signal Sin1) includes the first identification data Rid1, the bridge signal distribution unit 32 may output the first contact reception signal T1 (the first reception signal Sin1) to the first bridge signal transmission/reception coil 33A, and when the first contact reception signal T1 (the first reception signal Sin1) does not include the first identification data Rid1, the bridge signal distribution unit 32 may not output the first contact reception signal T1 (the first reception signal Sin1) to the first bridge signal transmission/reception coil 33A. In this case, the bridge signal distribution unit 32 outputs the first contact reception signal T1 (the first reception signal Sin1) to the first bridge signal transmission/reception coil 33A that can transmit and receive signals to and from the first signal processing unit 11A that can process the first contact reception signal T1 (the first reception signal Sin1) by outputting the first contact reception signal T1 (the first reception signal Sin1) to the first bridge signal transmission/reception coil 33A when the first contact reception signal T1 (the first reception signal Sin1) includes the first identification data Rid1.

In the embodiment, the bridge signal distribution unit 32 outputs the second non-contact reception signal U2 (the second output signal Sout2) to each of the first bridge signal transmission/reception terminal 31A, the second bridge signal transmission/reception terminal 31B, and the third bridge signal transmission/reception terminal 31C. However, the present invention is not limited to this. When the second non-contact reception signal U2 (the second output signal Sout2) includes the second identification data Rid2, the bridge signal distribution unit 32 may output the second non-contact reception signal U2 (the second output signal Sout2) to the second bridge signal transmission/reception terminal 31B, and when the second non-contact reception signal U2 (the second output signal Sout2) does not include the second identification data Rid2, the bridge signal distribution unit 32 may not output the second non-contact reception signal U2 (the second output signal Sout2) to the second bridge signal transmission/reception terminal 31B. In this case, the bridge signal distribution unit 32 outputs the second non-contact reception signal U2 (the second output signal Sout2) to the second bridge signal transmission/reception terminal 31B that can transmit and receive signals to and from the second external signal processing unit 21B that can process the second non-contact reception signal U2 (the second output signal Sout2) by outputting the second non-contact reception signal U2 (the second output signal Sout2) to the second bridge signal transmission/reception terminal 31B when the second non-contact reception signal U2 (the second output signal Sout2) includes the second identification data Rid2.

The signal distribution unit 12 may include a plurality of switches. The signal distribution instruction unit 14 may output a switch open/close signal for instructing the open/close state of each of the plurality of switches.

In this case, the signal distribution unit 12 outputs the first reception signal Sin1 to the first signal processing unit 11A such that the first signal processing unit 11A can process the first reception signal Sin1 by opening and closing the plurality of switches based on the switch open/close instruction signal output from the signal distribution instruction unit 14.

Further, the signal distribution unit 12 outputs the second output signal Sout2 to the second external signal processing unit 21B such that the second external signal processing unit 21B can process the second output signal Sout2 by opening and closing the plurality of switches based on the switch open/close instruction signal output from the signal distribution instruction unit 14.

The bridge signal distribution unit 32 may include a plurality of switches. The signal distribution instruction unit 34 may output a switch open/close signal for instructing the open/close state of each of the plurality of switches.

In this case, the bridge signal distribution unit 32 outputs the first contact reception signal T1 (the first reception signal Sin1) to the first bridge signal transmission/reception coil 33A that can transmit and receive signals to and from the first signal processing unit 11A that can process the first contact reception signal T1 (the first reception signal Sin1) by opening and closing the plurality of switches based on the switch open/close instruction signal output from the bridge signal distribution instruction unit 34.

Further, the bridge signal distribution unit 32 outputs the second non-contact reception signal U2 (the second output signal Sout2) to the second bridge signal transmission/reception terminal 31B that can transmit and receive signals to and from the second external signal processing unit 21B that can process the second non-contact reception signal U2 (the second output signal Sout2) by opening and closing the plurality of switches based on the switch open/close instruction signal output from the bridge signal distribution instruction unit 34.

The embodiment is based on the assumption that the signal processing apparatus 10 and the external signal processing unit 21 process signals standardized under the same standards. However, the present invention is not limited to this. The signal processing apparatus 10 and the external signal processing unit 21 may process signals standardized under different standards.

In this case, the bridge signal distribution unit 32 needs to have a signal converting function. The "signal converting" here means adding some change to the signals while maintaining all or part of the information included in the signals (for example, changing the amplitudes, phases, delay times, and others of the signals, adding predetermined data to the signals, deleting predetermined data from the signals, changing the order of the signals, and others).

For example, when the first contact reception signal T1 cannot be processed by the first signal processing unit 11A, the second signal processing unit 11B, or the third signal processing unit 11C, the bridge signal distribution unit 32 may convert the first contact reception signal T1 such that at least one of the first signal processing unit 11A, the second signal processing unit 11B, and the third signal processing unit 11C can process the first contact reception signal T1, and output the converted first contact reception signal T1 to the bridge signal transmission/reception coil (at least one of the first bridge signal transmission/reception coil 33A, the second bridge signal transmission/reception coil 33B, and the third bridge signal transmission/reception coil 33C) that can transmit and receive signals to and from the signal processing unit (at least one of the first signal processing unit 11A, the second signal processing unit 11B, and the third signal processing unit 11C) that can process the converted first contact reception signal T1.

In addition, for example, when the second non-contact reception signal U2 cannot be processed by the first external signal processing unit 21A, the second external signal processing unit 21B, or the third external signal processing unit 21C, the bridge signal distribution unit 32 may convert the second non-contact reception signal U2 such that at least one of the first external signal processing unit 21A, the second external signal processing unit 21B, and the third external signal processing unit 21C can process the second non-contact reception signal U2, and output the converted second non-contact reception signal U2 to the bridge signal transmission/reception terminal (at least one of the first bridge signal transmission/reception terminal 31A, the second bridge signal transmission/reception terminal 31B, and the third bridge signal transmission/reception terminal 31C) that can transmit and receive signals to and from the external signal processing unit (at least one of the first external signal processing unit 21A, the second external signal processing unit 21B, and the third external signal processing unit 21C) that can process the converted second non-contact reception signal U2.

Accordingly, even when the processable signals are different between the signal processing unit 11 and the external signal processing unit 21, the signal bridge device 30 allows the signal processing unit 11 and the external signal processing unit to transmit and receive mutually processable signals to and from each other. Accordingly, even when the signal processing unit 11 and the external signal processing unit 21 process signals in conformity with different standards, the signal bridge device 30 allows the signal processing unit 11 and the external signal processing unit 21 to transmit and receive signals to and from each other such that the signal processing unit 11 and the external signal processing unit 21 can mutually process the transmitted and received signals. Therefore, the signal bridge device 30 allows the external signal processing unit 21 incapable of transmitting and receiving signals directly to and from the signal processing apparatus 10 transmitting and receiving signals without contact to transmit and receive signals to and from the signal processing apparatus 10. Even when the signal processing apparatus 10 and the external signal processing unit 21 process signals standardized under different standards, the signal bridge device 30 allows the transmission and reception of signals between the signal processing apparatus 10 and the external signal processing unit 21 such that the signal processing apparatus 10 and the external signal processing unit 21 can process the transmitted and received signals.

In the signal bridge processing system 1 of the embodiment, the signal processing device 10 and the external signal processing units 21 (the first external signal processing unit 21A, the second external signal processing unit 21B, and the third external signal processing unit 21C) transmit and receive signals to and from each other via the signal bridge device 30 and the interposer unit 40. However, the present invention is not limited to this. The signal processing apparatus 10 and the external signal processing unit 21 (the first external signal processing unit 21A, the second external signal processing unit 21B, and the third external signal processing unit 21C) may transmit and receive signals to and from each other with intervention of the signal bridge device 30, not with intervention of the interposer unit 40. Specifically, the signal transmission/reception coils (the first signal transmission/reception coil 13A, the second signal transmission/reception coil 13B, and the third signal transmission/reception coil 13C) in the signal processing apparatus 10 and the bridge signal transmission/reception coils (the first bridge signal transmission/reception coil 33A, the second bridge signal transmission/reception coil 33B, and the third bridge signal transmission/reception coil 33C) may transmit and receive signals to and from each other without contact.

The coils in the embodiment are single windings of coils as illustrated in FIGS. 2A to 2C but may be plural windings of coils instead.

In the embodiment, the transmission and reception of signals without contact are carried out by a predetermined method, that is, inductive coupling between coils. However, the present invention is not limited to this. The transmission and reception of signals without contact may be carried out by the use of magnetic resonance between coils or by the use of optical signals or sound wave signals.

In the signal bridge device 30 of the embodiment, the bridge signal transmission/reception terminal 31 as the second bridge signal transmission/reception unit transmits and receives signals with contact. However, the present invention is not limited to this. The second bridge signal transmission/reception unit may not transmit and receive signals with a terminal but may transmit and receive signals without contact.

When the second bridge signal transmission/reception unit transmits and receives signals without contact, the second bridge signal transmission/reception unit may transmit and receive signals without contact by a method different from the predetermined method used by the first bridge signal transmission/reception unit (the bridge signal transmission/reception coil 33) to transmit and receive signals without contact. For example, the first signal transmission/reception unit may transmit and receive signals without contact by the use of inductive coupling between the coils, and the second signal transmission/reception unit may transmit and receive signals without contact by the use of magnetic resonance between the coils, optical signals, or sound wave signals.

When the second bridge signal transmission/reception unit transmits and receives signals without contact, the second bridge signal transmission/reception unit may transmit and receive signals without contact by the same method as the predetermined method used by the first bridge signal transmission/reception unit (the bridge signal transmission/reception coil 33) to transmit and receive signals without contact. For example, the first signal transmission/reception unit and the second signal transmission/reception unit may transmit and receive signals to and from each other without contact by the use of inductive coupling between the coils. However, even though the first signal transmission/reception unit and the second signal transmission/reception unit transmit and receive signals to and from each other without contact by the same method, the processable signals may be different between the signal processing unit 11 and the external signal processing unit 21. Even in such a case, with the function of converting signals, the signal bridge device 30 can provide the advantage of allowing the signal processing unit 11 and the external signal processing unit 21 to transmit and receive mutually processable signals to and from each other. The signal bridge device 30 with the signal converting function is the same as described above. Accordingly, the signal bridge device 30 allows the external signal processing unit 21 incapable of transmitting and receiving signals directly to and from the signal processing apparatus 10 transmitting and receiving signals without contact to transmit and receive signals to and from the signal processing apparatus 10.

In the embodiment, the three signal processing units 11 and the three external signal processing units 21 are provided. However, the present invention is not limited to this. The number of signal processing units 11 and external signal processing units 21 may be one or more. In the embodiment, the first signal processing unit 11A, the second signal processing unit 11B, and the third signal processing unit 11C are built in one package. However, the present invention is not limited to this. The first signal processing unit 11A, the second signal processing unit 11B, and the third signal processing unit 11C may be built in respective independent packages. In the embodiment, the first external signal processing unit 21A, the second external signal processing unit 21B, and the third external signal processing unit 21C are built in respective independent packages. However, the present invention is not limited to this. Some or all of the first external signal processing unit 21A, the second external signal processing unit 21B, and the third external signal processing unit 21C may be built in one package. The first signal processing unit 11A, the second signal processing unit 11B, and the third signal processing unit 11C may be signal processing units having different functions, or some or all of the first signal processing unit 11A, the second signal processing unit 11B, and the third signal processing unit 11C may be signal processing units having the same function. The first external signal processing unit 21A, the second external signal processing unit 21B, and the third external signal processing unit 21C may be signal processing units having different functions, or some or all of the first external signal processing unit 21A, the second external signal processing unit 21B, and the third external signal processing unit 21C may be signal processing units having the same function.

In this embodiment, three of each of (three sets of) signal transmission/reception coils, signal paths, and external signal transmission/reception coils are provided. However, the present invention is not limited to this. An arbitrary number or arbitrary sets of the signal transmission/reception coils, signal paths, and external signal transmission/reception coils may be provided.

EXPLANATION OF REFERENCE NUMERALS

1 Signal bridge processing system
10 Signal processing device
11 Signal processing unit
11A First signal processing unit
11B Second signal processing unit
11C Third signal processing unit
12 Signal distribution unit
13 Signal transmission/reception coil
13A First signal transmission/reception coil (first signal transmission/reception unit)
13B Second signal transmission/reception coil (second signal transmission/reception unit)
13C Third signal transmission/reception coil (third signal transmission/reception unit)
14 Signal distribution instruction unit
21 External signal processing unit
21A First external signal processing unit
21B Second external signal processing unit
21C Third external signal processing unit
23 External signal transmission/reception terminal (external signal transmission/reception unit)
23A First external signal transmission/reception terminal
23B Second external signal transmission/reception terminal
23C Third external signal transmission/reception terminal
40 Interposer unit
41 First signal path
41A First signal processing device-side coil (signal processing device-side signal transmission/reception unit)
41B First external signal processing unit-side coil (external signal processing unit-side signal transmission/reception unit)
42 Second signal path
42A Second signal processing device-side coil (signal processing device-side signal transmission/reception unit)
42B Second external signal processing unit-side coil (external signal processing unit-side signal transmission/reception unit)
43 Third signal path
43A Third signal processing device-side coil (signal processing device-side signal transmission/reception unit)
43B Third external signal processing unit-side coil (external signal processing unit-side signal transmission/reception unit)
30 Signal bridge device
31 Bridge signal transmission/reception terminal (second bridge signal transmission/reception unit)
31A First bridge signal transmission/reception terminal
31B Second bridge signal transmission/reception terminal
31C Third bridge signal transmission/reception terminal 32 Signal bridge distribution unit
33 Bridge signal transmission/reception unit (first bridge signal transmission/reception unit)
33A First bridge signal transmission/reception coil
33B Second bridge signal transmission/reception coil
33C Third bridge signal transmission/reception coil
34 Bridge signal distribution instruction unit
Sin1 First reception signal
Sin2 Second reception signal
Sin3 Third reception signal
Sout1 First output signal
Sout2 Second output signal
Sout3 Third output signal
U Reception signal (reception signal U)
U1 First non-contact reception signal U (reception signal U1)
U2 Second non-contact reception signal U (reception signal U2)
U3 Third non-contact reception signal U (reception signal U3)
T Reception signal (reception signal T)
T1 First contact reception signal (reception signal T1)
T2 Second contact reception signal (reception signal T2)
T3 Third contact reception signal (reception signal T3)

The invention claimed is:

1. A signal bridge processing system comprising:
a signal bridge device comprising: a plurality of first bridge signal transmission/reception units; a plurality of second bridge signal transmission/reception units; a bridge signal distribution unit that is electrically connected to the plurality of first bridge signal transmission/reception units and is electrically connected to the second bridge signal transmission/reception units; and a bridge signal distribution instruction unit, wherein each of the plurality of first bridge signal transmission/reception units can transmit and receive signals to and from an external signal processing unit-side signal transmission/reception unit outside of the signal bridge device without contact by a predetermined method, each of the plurality of second bridge signal transmission/reception units can transmit and receive signals to and from an external signal transmission/reception unit outside of the signal bridge device without contact by a method different from the predetermined method or can transmit and receive signals to and from the external signal transmission/reception unit outside of the signal bridge device with contact, a reception signal U received by each of the plurality of first bridge signal transmission/reception units is input into the bridge signal distribution unit, a reception signal T received by each of the plurality of second bridge signal transmission/reception units is input into the bridge signal distribution unit, the reception signal T including a reception signal T1, the bridge signal distribution unit can output the reception signal U to each of the plurality of second bridge signal transmission/reception units and output the reception signal T to each of the plurality of first bridge signal transmission/reception units, the bridge signal distribution unit outputs the reception signal T1 to, among the plurality of first bridge signal transmission/reception units, at least one first bridge signal transmission/reception unit that can transmit and receive signals to and from a signal processing unit that can process the reception signal T1, the bridge signal distribution unit has a plurality of switches, the bridge signal distribution instruction unit outputs a switch open/close instruction signal for instructing open/close state of each of the plurality of switches, and the bridge signal distribution unit outputs the reception signal T1 to the one first bridge signal transmission/reception unit by opening and closing the plurality of switches based on the switch open/close instruction signal, and
an interposer unit that has a plurality of external signal processing unit-side signal transmission/reception units as the plurality of external signal transmission/reception units and a plurality of signal processing device-side signal transmission/reception units that are electrically connected to the plurality of external signal processing unit-side signal transmission/reception units;
a signal processing device that can transmit and receive signals to and from the plurality of signal processing device-side signal transmission/reception units; and an external signal processing unit that has the plurality of external signal transmission/reception units,
wherein the signal processing device and the external signal processing unit transmit and receive signals to and from each other via the signal bridge device and the interposer unit,
wherein the plurality of the external signal processing unit-side signal transmission/reception units and the plurality of signal processing device-side signal transmission/reception units further comprises: coils formed by wires for inductive coupling.

2. The signal bridge processing system according to claim 1, wherein the signal processing unit can process a signal including identification data, and the bridge signal distribution unit outputs the reception signal T1 to the at least one first bridge signal transmission/reception unit by outputting the reception signal T1 to the at least one first bridge signal transmission/reception unit when the reception signal T1 includes the first identification data.

3. The signal bridge processing system according to claim 1, wherein the bridge signal distribution unit converts the reception signal T1 so that a signal processing unit capable of transmitting and receiving signals to and from at least one of the plurality of first bridge signal transmission/reception units can process the reception signal T1, and outputs the converted reception signal T1 to at least one of the plurality of first bridge signal transmission/reception units that can transmit and receive signals to and from the signal processing unit.

4. A signal bridge processing system comprising:
a signal bridge device comprising: a plurality of first bridge signal transmission/reception units; a plurality of second bridge signal transmission/reception units; a bridge signal distribution unit that is electrically connected to the plurality of first bridge signal transmission/reception units and is electrically connected to the second bridge signal transmission/reception units; and a bridge signal distribution instruction unit, wherein each of the plurality of first bridge signal transmission/reception units can transmit and receive signals to and from an external signal processing unit-side signal transmission/reception unit outside of the signal bridge device without contact by a predetermined method, each of the plurality of second bridge signal transmission/reception units can transmit and receive signals to and from an external signal transmission/reception unit outside of the signal bridge device without contact by a method different from the predetermined method or can transmit and receive signals to and from the external signal transmission/reception unit outside of the signal bridge device with contact, a reception signal U received by each of the plurality of first bridge signal transmission/reception units is input into the bridge signal distribution unit, the reception signal U including a reception signal U2, a reception signal T received by each of the plurality of second bridge signal transmission/reception units is input into the bridge signal distribution unit, the bridge signal distribution unit can output the reception signal U to each of the plurality of second bridge signal transmission/reception units and output the reception signal T to each of the plurality of first bridge signal transmission/reception units, the bridge signal distribution unit outputs the reception signal U2 to, among the plurality of second bridge signal transmission/reception units, at least one second bridge signal transmission/reception unit that can transmit and receive signals to and from an external signal processing unit that can process the reception signal U2, the bridge signal distribution unit has a plurality of switches, the bridge signal distribution instruction unit outputs a switch open/close instruction signal for instructing open/close state of each of the plurality of switches, and the bridge signal distribution unit outputs the reception signal U2 to the at least one second bridge signal transmission/reception unit by opening and closing the plurality of switches based on the switch open/close instruction signal, and an interposer unit that has a plurality of external signal processing unit-side signal transmission/reception units as the plurality of external signal transmission/reception units and a plurality of signal processing device-side signal transmission/reception units that are electrically connected to the plurality of external signal processing unit-side signal transmission/reception units; a signal processing device that can transmit and receive signals to and from the plurality of signal processing device-side signal transmission/reception units; and an external signal processing unit that has the plurality of external signal transmission/reception units, wherein the signal processing device and the external signal processing unit transmit and receive signals to and from each other via the signal bridge device and the interposer unit, wherein the plurality of the external signal processing unit-side signal transmission/reception units and the plurality of signal processing device-side signal transmission/reception units further comprises: coils formed by wires for inductive coupling.

5. The signal bridge processing system according to claim 4, wherein the external signal processing unit can process a signal including identification data, and the bridge signal distribution unit can output the reception signal U2 to the at least one second bridge signal transmission/reception unit by outputting the reception signal U2 to the at least one second bridge signal transmission/reception unit when the reception signal U2 includes the second identification data.

6. The signal bridge processing system according to claim 4, wherein the bridge signal distribution unit converts the reception signal U2 so that an external signal processing unit capable of transmitting and receiving signals to and from at least one of the plurality of second bridge signal transmission/reception units can process the reception signal U2, and outputs the converted reception signal U2 to at least one of the plurality of first bridge signal transmission/reception units that can transmit and receive signals to and from the external signal processing unit.

* * * * *